(12) United States Patent
Chen et al.

(10) Patent No.: US 6,658,019 B1
(45) Date of Patent: Dec. 2, 2003

(54) REAL-TIME VIDEO TRANSMISSION METHOD ON WIRELESS COMMUNICATION NETWORKS

(75) Inventors: Shu-Chin Su Chen, Hsinchu (TW); Chih-Chin Liu, Tu Cheng (TW)

(73) Assignee: Industrial Technology Research Inst., Hsinchu (TW)

( * ) Notice: Subject to any disclaimer, the term of this patent is extended or adjusted under 35 U.S.C. 154(b) by 0 days.

(21) Appl. No.: 09/478,547

(22) Filed: Jan. 6, 2000

(30) Foreign Application Priority Data

Sep. 16, 1999 (TW) .................................. 88115967 A

(51) Int. Cl.⁷ .............................. H04J 3/16; H04J 3/22
(52) U.S. Cl. ...................... 370/465; 370/542; 370/329; 379/240.27; 382/232; 382/236
(58) Field of Search ................................. 370/329, 465, 370/328, 542; 382/232, 238, 236; 375/240.27; 348/470

(56) References Cited

U.S. PATENT DOCUMENTS

| | | | |
|---|---|---|---|
| 5,105,442 A | | 4/1992 | Wei .............................. 375/39 |
| 5,214,656 A | | 5/1993 | Chung et al. .................. 371/43 |
| 5,243,629 A | | 9/1993 | Wei .............................. 375/59 |
| 5,305,352 A | | 4/1994 | Calderbank et al. ........... 375/39 |
| 5,581,481 A | * | 12/1996 | Weerackody et al. ....... 382/232 |
| 5,671,156 A | * | 9/1997 | Weerackody et al. ....... 370/487 |
| 5,689,439 A | * | 11/1997 | Weerackody et al. ....... 370/329 |
| 5,757,821 A | | 5/1998 | Jamal et al. ................... 371/30 |
| 5,799,013 A | | 8/1998 | Seshadri et al. ............. 370/342 |
| 6,141,448 A | * | 10/2000 | Khansari et al. ............. 382/238 |
| 6,157,612 A | * | 12/2000 | Weerackody et al. ....... 370/215 |
| 6,289,054 B1 | * | 9/2001 | Rhee ....................... 375/240.27 |
| 6,339,450 B1 | * | 1/2002 | Chang et al. ................ 348/470 |
| 6,421,387 B1 | * | 7/2002 | Rhee ....................... 375/240.27 |

OTHER PUBLICATIONS

IEEE, vol. 7, No. 5, Jun. 1989, pp. 807~814. "Selective Recovery of Video Packet Loss Using Error Concealment" by Masahiro Wada.
IEEE, vol. 8, No. 3, Jun. 1998, pp 275~286, "Programmable H.263–Based Wireless Video Transceivers for Interference—Limited Environments" by Peter Cherriman and Lajos Hanzo.
IEEE, vol. 8, No. 1, Feb. 1998, p.p. 74~84, "Detection and Concealment of Transmission Errors in H.261 Images" by Wen–Jeng Chu and Jin–Jang Leai.
IEEE, 1994, p.p. 1020~1024, "An Unequal Error Protected px8 kbit/s Video Transmission for DECT" by R. Mann Pelz.
IEEE, vol. 7, No. 6, Dec. 1997, p.p. 872~881, "Standard Compatible Extension of H.263 for Robust Video Transmission in Mobile Environments"by Eckehard Steinbach, Niko Farber, and Bernd Girod.
IEEE, 1998, p.p. 1156~1163, "Data Transfer Scheme for Wireless Real–Time Communications" by Chiung–Shien Wu and Gin–Kou Ma.

* cited by examiner

Primary Examiner—Wellington Chin
Assistant Examiner—Chuong Ho
(74) Attorney, Agent, or Firm—Bacon & Thomas, PLLC

(57) ABSTRACT

In a wireless video transmission method for transmitting a video stream on wireless communication networks, the video stream is classified into at least two classes of sensitivity, each corresponding to a sensitive class of data. Each sensitive class of data is optionally advanced an ahead time for starting transmission based on the corresponding class of sensitivity. Then, an automatic repeat of data is optionally applied on each sensitive class of data based on the corresponding class of sensitivity, thereby providing an enhanced error protective capability and reducing the transmission delay.

7 Claims, 4 Drawing Sheets

REAL-TIME VIDEO TRANSMISSION METHOD ON WIRELESS COMMUNICATION NETWORKS

BACKGROUND OF THE INVENTION

1. Field of the Invention

The present invention relates to the field of wireless communication, more particularly, to a real-time video transmission method on wireless communication networks.

2. Description of Related Art

The development of third generation mobile communication systems will enable the transmission of digital video over wireless networks. A key problem that has to be solved for wireless video transmission is how to deliver video streams of an acceptable quality over low-bit rate channels with burst errors while meeting the real-time requirements of video applications. Conventionally, there are two approaches to protect video data against transmission errors, which are the channel coding approach and the error retransmission approach. In the channel coding approach, video data is coded using an error control code for data being transmitted. Therefore, when the transmitted video data has errors, it can be corrected by the error control code. However, due to the use of this error control code, the channel coding approach introduces a prohibitive amount of overhead in order to provide the necessary correcting ability over error prone channel. As for the error retransmission approach, it retransmits data only when the corresponding received video data is not correct. Although such an approach may reduce the redundancy data transmitted, additional delay is introduced due to possible retransmission of corrupted data. Moreover, larger buffers are needed in both the transmitter and receiver sides, resulting in a high hardware cost. Therefore, there is a need to have a real-time video transmission method that can mitigate and/or obviate the aforementioned problems.

SUMMARY OF THE INVENTION

Accordingly, the object of the present invention is to provide a real-time video transmission method on wireless communication networks, such that a video stream is provided with a satisfactory error protective capability when being transmitted over a wireless channel, and the transmission delay can be reduced.

To achieve the object, the wireless video transmission method in accordance with the present invention first classifies the video stream into at least two classes of sensitivity, each corresponding to a sensitive class of data. Then, an automatic repeat request scheme is optionally applied on each sensitive class of data based on the corresponding class of sensitivity, wherein a sensitive class of data with a relative high class of sensitivity is assigned an automatic repeat request scheme having a relative high reliability.

The various objects and advantages of the present invention will be more readily understood from the following detailed description when read in conjunction with the appended drawing.

DETAILED DESCRIPTION OF THE PREFERRED EMBODIMENT

Figure 1:
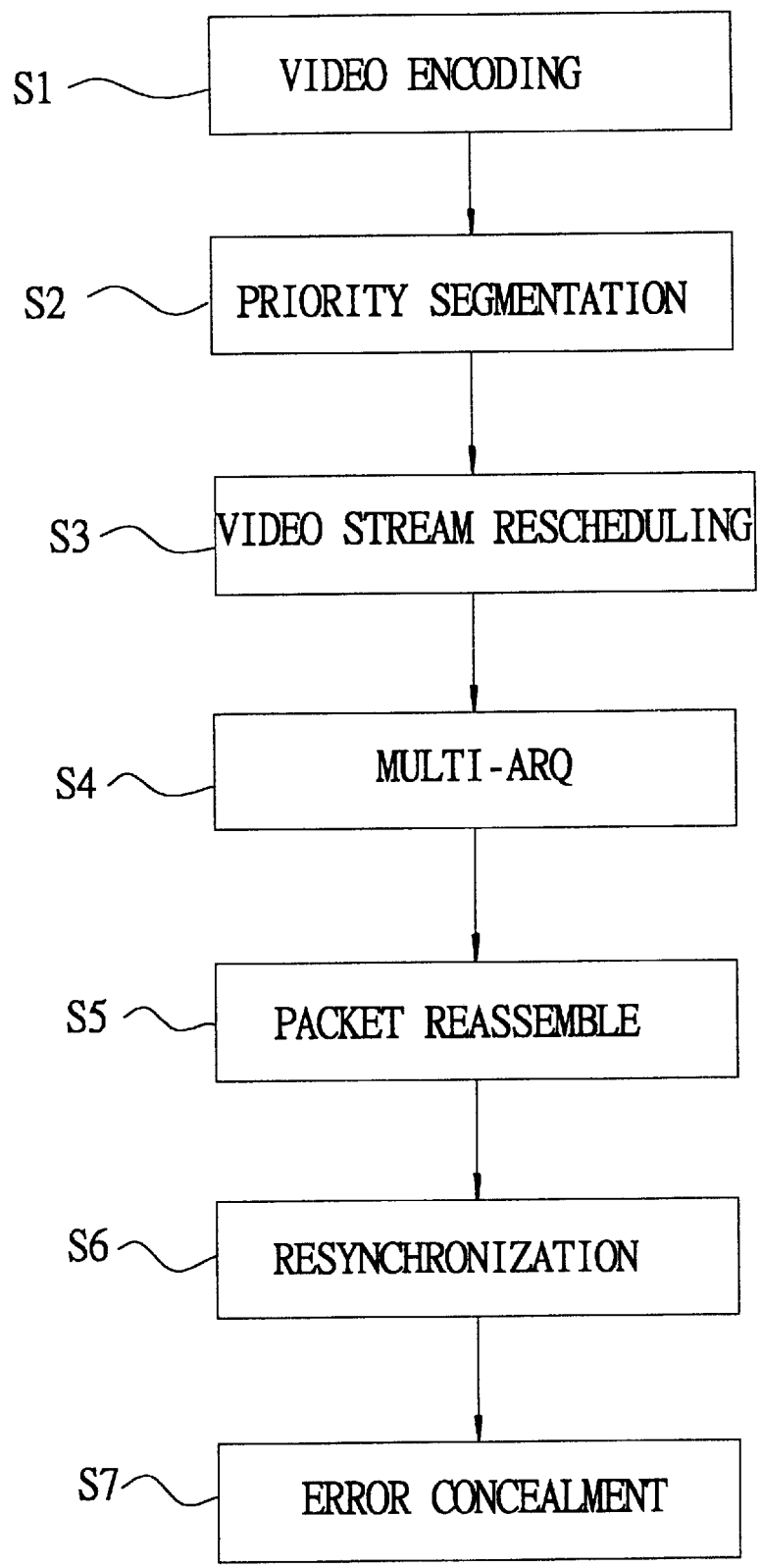
FIG. 1 is a system flow chart for the real-time video transmission method on wireless communication networks in accordance with the present invention.

FIG. 1 is a system flow chart for the real-time video transmission method on wireless communication networks in accordance with the present invention. It is illustrated that a video stream is processed by a video encoding step S1, a priority segmentation step S2, and a video stream rescheduling step S3, and then processed by a multi-automatic repeat request (multi-ARQ) step S4, thereby transmitting the video stream over a wireless channel. The corresponding received data is processed by a package reassemble step S5 and a resynchronization step S6 to recover the original video stream. An error concealment step S7 may be further undertaken to conceal any possible remaining errors. The real-time video transmission method on wireless communication networks in accordance with the present invention utilizes the multi-ARQ step S4 and video stream rescheduling step S3 to reduce the time for retransmission when transmission errors are encountered, such that real-time video data can be transmitted over a low-bit rate wireless channel.

The multi-ARQ step S4 is based on the concept of unequal error protection, wherein video data with different sensitivities are provided with automatic repeat request (ARQ) schemes with different reliabilities or no ARQ scheme. That is, higher sensitive portions of video data are protected by higher reliable ARQ schemes to protect video data against transmission errors. The sensitivity of a portion of a video stream is defined as thee resultant distortion if this portion of data is corrupted.

Figure 2:
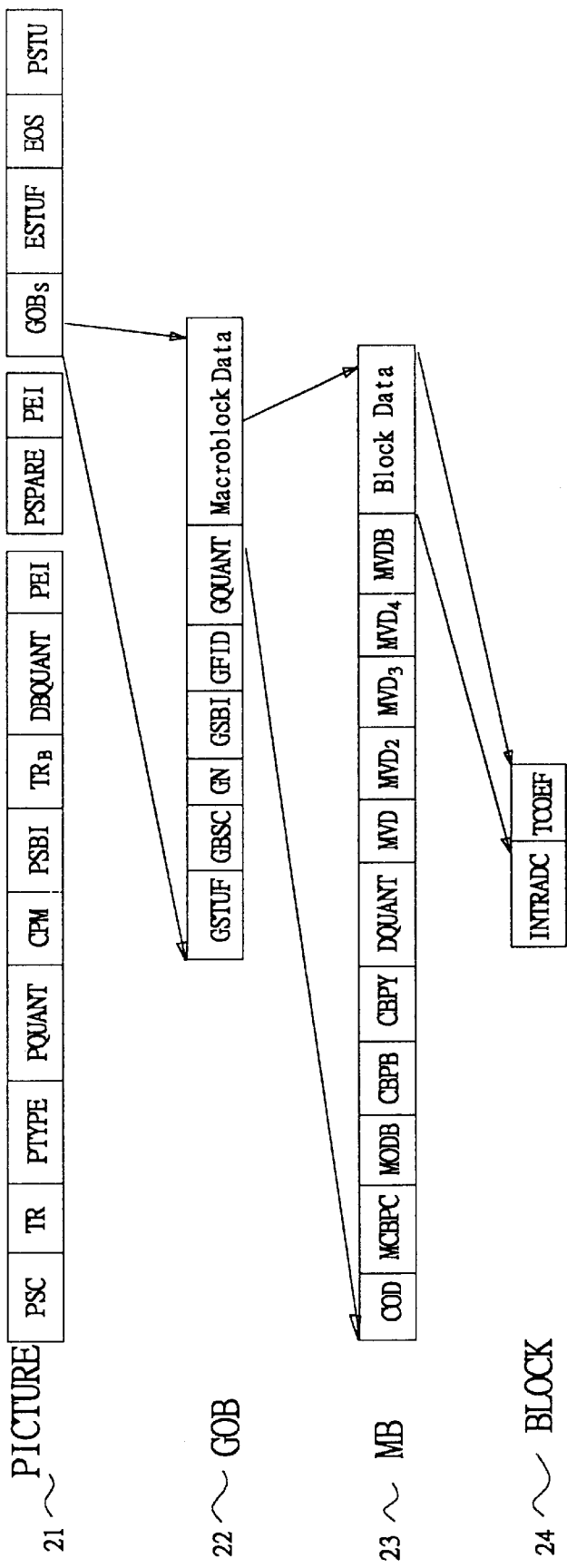
FIG. 2 illustrates the hierarchy structure of a H.263 video stream.

Taking a video stream conforming to the H.263 standard recommended by International Telecommunication Union (ITU) as an example, the H.263 video stream is organized hierarchically into groups of pictures which includes one or more frames, each of which represents a single image of a sequence of images of the video stream. The frames are further classified into an I-frame which is encoded independently of all other frames, and a motion-compensated P-frame which is encoded dependent upon other frames. The hierarchy structure of such a H.263 video stream is illustrated in FIG. 2, which includes, from top to bottom, a picture layer 21, a group of blocks (GOB) layer 22, a macroblock (MB) layer 23, and a block layer 24. The picture layer 21 includes a picture header followed by data for group of blocks. The group of blocks layer 22 includes a GOB header followed by data for macroblocks. The macroblock layer 23 includes a macroblock header followed by data for blocks. The block layer 24 includes block data. Because the header information of the video stream consists of important system control information, it is more sensitive than the data in other portions of the video stream. Moreover, since inter-frame coding will result in errors being propagated in the subsequent frames, the discrete cosine transformation (DCT) coefficients of the I-frames are more sensitive than that of the P-frame. Thus, in the priority segmentation step S2, the H.263 video stream can be classified into three classes of sensitivity as follows:

(1) high sensitive data: all header information such as picture headers, GOB headers, and macroblock headers;

(2) medium sensitive data: the DCT coefficients of I-frames; and (3) low sensitive data: the DCT coefficients of P-frames.

After the H.263 video stream is classified into the aforementioned three classes of sensitivity, in the multi-ARQ step S4, unequal error protection can be achieved by applying higher reliable ARQ schemes on more sensitive classes of data. Therefore, for the high sensitive data, a high reliable selective reject ARQ (SR-ARQ) scheme is applied thereon to protect data against transmission errors. Assume "k" to be the maximum number of retransmissions for each corrupted data packet being allowed, and "PER" to be the packet error rate, the packet loss rate will be $O(PERk^{k+1})$. In general, the allowed retransmission time for the SR-ARQ scheme is 4, for example, so that the package loss rate is $O(PER^5)$. For medium sensitive data, a low reliable burst-oriented transfer with time-bounded retransmission ARQ (BTTR-ARQ) scheme is applied thereon to protect data against transmission errors. The package loss rate is approximately $O(PER^2)$. For low sensitive data, since the corrupted data packets of such low sensitive data will result in less visual distortion, no ARQ scheme is applied thereon, so that the time for retransmission can be saved. The package loss rate is thus $O(PER^1)$.

Figure 3A:
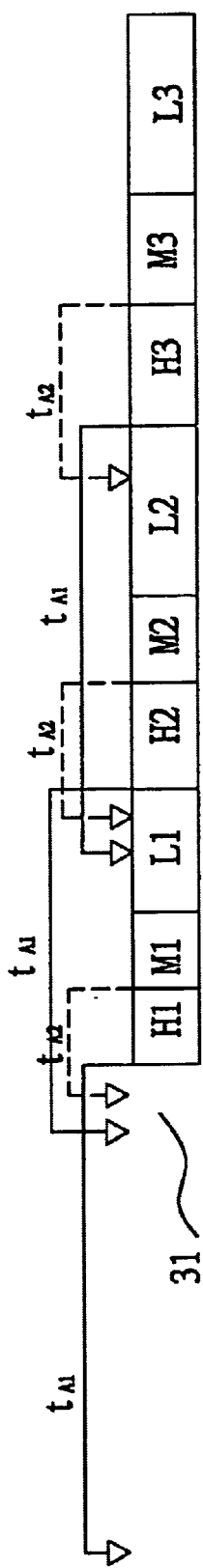
FIG. 3A shows a video stream consisting of nine segments.
Figure 3B:
FIG. 3B shows the logical transmission order of the video stream shown in FIG. 3A after rescheduling.
Figure 3C:
FIG. 3C shows the real starting time of transmission for the nine segments of the video stream shown in FIG. 3A after rescheduling.
Figure 3C:
Figure 3C:
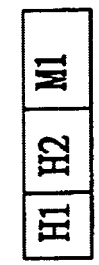

To meet the real-time requirement of video transmission, all transmitted packets should be received within the maximum acceptable latency time. To guarantee higher reliability for sensitive data, the number of retransmissions will increase. This introduces additional round-trip delay which could be unacceptable for high-speed networks or satellite links. To solve this problem, in the video stream rescheduling step S3, the transmitting time of high sensitive packets can be antedated to reserve an additional time period for possible retransmissions. FIGS. 3A to 3C illustrate an example of rescheduling a video stream, wherein FIG. 3A shows the video stream 31 consists of nine segments, which are classified into three classes of sensitivity. That is, H1, H2 and H3 are high sensitive data. M1, M2 and M3 are medium sensitive data. L1, L2 and L3 are low sensitive data. The original transmission order for the nine segments is H1, M1, L1, H2, M2, L2, H3, M3 and L3 as shown in FIG. 3A. However, since H1, H2 and H3 have highest sensitivity, the time for starting transmission is advanced a first ahead time $t_{A1}$ earlier than the original start time. Similarly, M1, M2 and M3 are more sensitive than L1, L2 and L3 so that their time for starting transmission is advanced a second ahead time $t_{A2}$. After adjusting the start time of sensitive data, the logical transmission order and real starting time of transmission for the nine segments of the video stream 31 will be H1, H2, M1, H3, M2, L1, M3, L2, and L3, as shown in FIGS. 3B and 3C, respectively. Accordingly, data with higher sensitivity is substantially transmitted as early as possible so that sufficient time can be reserved for possible retransmission, whereby the real-time requirement is not affected by the retransmission.

Figure 4:
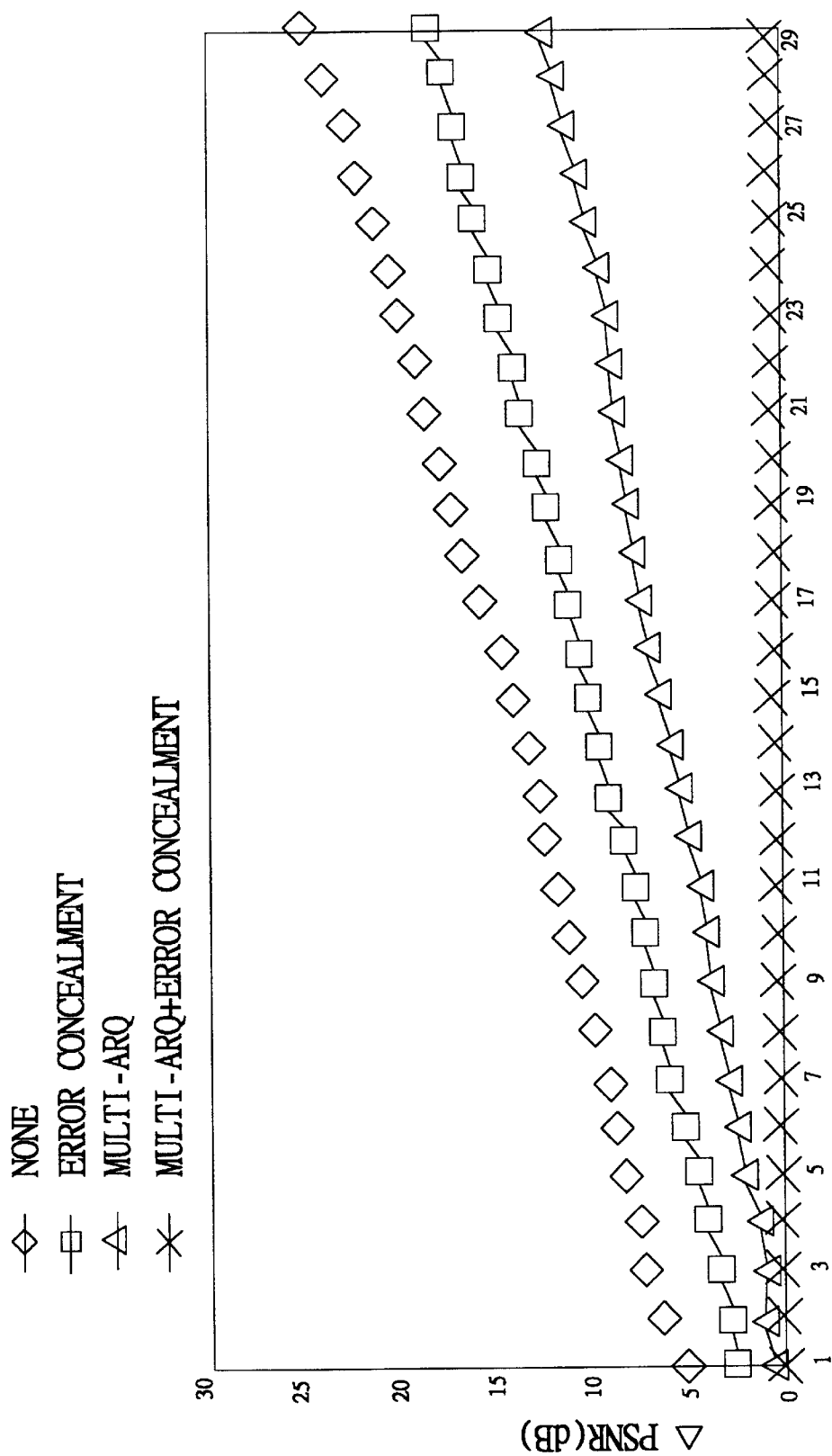
FIG. 4 shows the relation of the video frame number to the peak signal to noise ratio ($\Delta$PSNR) for various video transmission methods.

It is appreciated that the real-time video transmission method on wireless communication networks does present excellent performance when being tested. FIG. 4 shows the relation of the frame number to the peak signal to noise ration ($\Delta PSNR$) with $PER=10^{-2}$ for various video transmission methods, including the multi-ARQ and error concealment approaches, and their combination. It is illustrated that the video transmission method in accordance with the present invention has a better video protective capability. Moreover, the present method can be combined with a known error concealment approach in the error concealment step S7 to get better video quality. By reducing the number of corrupted data packets, the effect of the concealment approach is greatly enhanced and the average loss of video quality is approximate to 1 dB in 30 frames of a sequence.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A wireless video transmission method for transmitting a video stream on wireless communication networks, said video stream including headers, I-frames and P-frames, each of said I-frames and P-frames having discrete cosine transformation coefficients, said method comprising the steps of:

(A) classifying said video stream into high sensitive data, medium sensitive data and low sensitive data, said high sensitive data including the headers of said video stream, said medium sensitive data including the discrete cosine transformation coefficients of said I-frames of said video stream; and (B) optionally applying an automatic repeat request scheme on each of the high, medium and low sensitive data based on the sensitivity, wherein sensitive data with a relatively high sensitivity is assigned an automatic repeat request scheme having a relatively high reliability.

2. The wireless video transmission method as claimed in claim 1, further comprising a step (K) executed between step (A) and step (B) for rescheduling said video stream, wherein each of the high, medium and low sensitive data is optionally advanced an ahead time for starting transmission based on the corresponding sensitivity.

3. The wireless video transmission method as claimed in claim 2, wherein in step (B), when said high sensitive data is transmitted, a selective reject automatic repeat request scheme is applied thereon for protecting said video stream against transmission errors.

4. The wireless video transmission method as claimed in claim 2, wherein in step (B), when said medium sensitive data is transmitted, a burst-oriented transfer with a time-bounded retransmission automatic repeat request scheme is applied thereon for protecting said video stream against transmission errors.

5. The wireless video transmission method as claimed in claim 2, wherein in step (B), when said low sensitive data is transmitted, no automatic repeat request scheme is applied thereon.

6. The wireless video transmission method as claimed in claim 2, wherein in step (K), said high sensitive data is advanced a first ahead time for starting transmission, and said medium sensitive data is advanced a second ahead time for starting transmission, so that said video stream is transmitted in a sequence substantially based on the sensitivities.

7. The wireless video transmission method as claimed in claim 2, wherein said video stream is a H.263 video stream.

* * * * *